(No Model.)
J. W. DUDLEY.
AXLE BRAKE.
No. 561,873. Patented June 9, 1896.
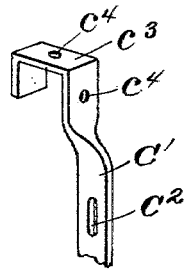
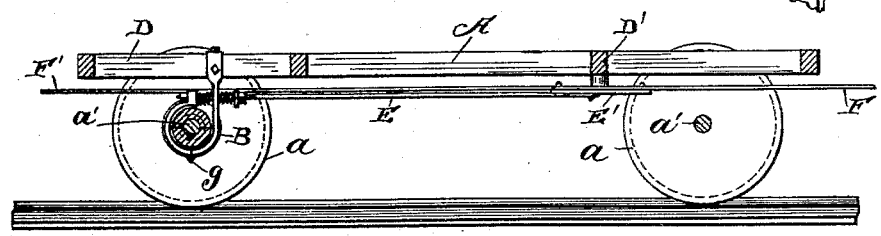
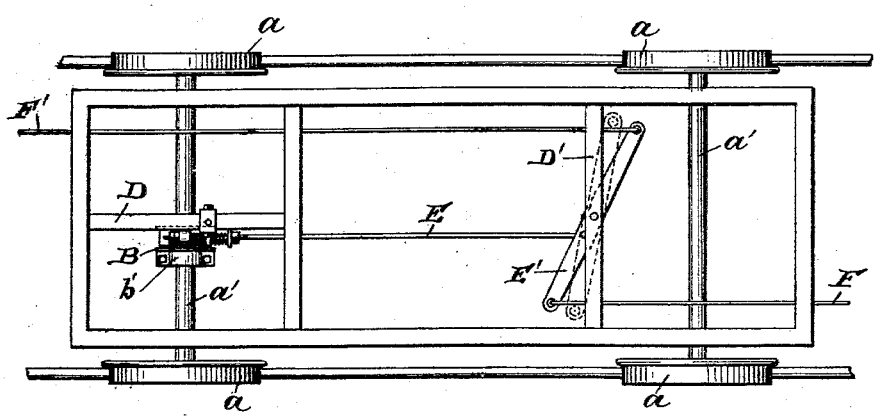
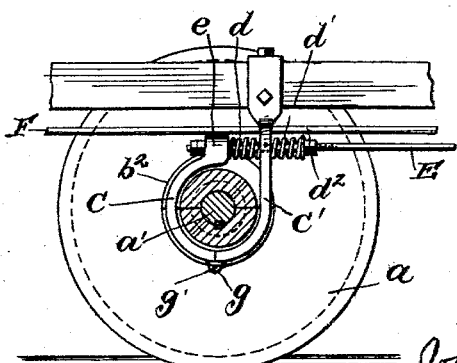
Witnesses:
R. J. Jacker
E. A. Duggan
Inventor:
John W. Dudley
By Chas. C. Tillman Atty.

UNITED STATES PATENT OFFICE.

JOHN W. DUDLEY, OF CHICAGO, ILLINOIS, ASSIGNOR OF ONE-HALF TO WILLIAM L. DUDLEY, OF SAME PLACE.

AXLE-BRAKE.

SPECIFICATION forming part of Letters Patent No. 561,873, dated June 9, 1896.

Application filed February 10, 1896. Serial No. 578,711. (No model.)

*To all whom it may concern:*

Be it known that I, JOHN W. DUDLEY, a citizen of the United States, residing at Chicago, in the county of Cook and State of Illinois, have invented certain new and useful Improvements in Axle-Brakes, of which the following is a specification.

This invention relates to improvements in brakes to be applied to the axles of cars; and it consists in certain peculiarities of the construction and in the novel arrangement and operation of the various parts thereof, as will be hereinafter more fully set forth and specifically claimed.

The objects of my invention are, first, to provide a brake which shall be simple and inexpensive in construction, strong and durable yet effective in operation; second, such a brake which by reason of the peculiar construction, arrangement, and operation of its parts will check or retard the progress of the wheels without causing the same to slide on the tracks, and, third, to provide a brake which is so cushioned by means of suitable springs upon the operating-rod as to be automatically held out of contact with the axle or drum thereon except when it is desired that the same shall be brought into contact therewith.

In order to enable others skilled in the art to which my invention pertains to make and use the same, I will now proceed to describe it, referring to the accompanying drawings, in which—

Figure 1 is a longitudinal sectional view of a portion of a car, showing my brake applied to one of the axles thereof. Fig. 2 is a plan view of the lower part of the car-frame, illustrating my brake in position thereon. Fig. 3 is a view in elevation, partly in section, showing the brake in position and a portion of the operating-rods. Fig. 4 is a view in side elevation of the split hub or drum, showing it keyed on the axle; and Fig. 5 is a detail perspective view of a portion of the brake-hanger.

Similar letters refer to like parts throughout the different views of the drawings.

A represents a portion of the frame of a car, which may be mounted upon wheels $a$, of the ordinary construction, and in the ordinary or any preferred manner. Upon one or more of the axles $a'$, and near their middle, is keyed or otherwise secured a drum B, which is preferably composed of two pieces $b$, semicircular in shape to fit around the axle, as shown in the drawings, which pieces are held together by means of suitable bolts $c$ and nuts $c'$, passed through lugs or projections $c^2$ on the outer surface of the hub $b'$. This drum is formed with flanges $b^2$ near each of its ends to provide a spool-shaped drum for the reception and operation of the brake C and hanger C'. The said hanger is formed or provided at its upper portion with a yoke $c^3$ to fit over a beam or bar D of the frame. The yoke is formed with holes $c^4$ for the reception of suitable bolts to secure it on the frame, as is apparent. Some distance below the yoke the hanger is formed with a vertical slot $C^2$ for the operation of the connecting-rod E, which is pivoted to a dead-lever E', fulcrumed on the bar D' of the main frame. This lever has secured to each of its ends operating-rods F and F', which may extend to the front and rear platforms of the car, and are there connected with suitable devices to operate the lever E' in the direction desired. While I have shown the connections F and F' as rods, yet it is obvious that chains or other connecting devices may be employed in lieu thereof.

As is clearly shown in Figs. 1 and 3 of the drawings, the hanger C' extends downward and around the drum B to about its middle and has pivotally secured at its lower end a circular shoe or brake C, the upper end of which is formed with an enlargement $e$, through which is passed the connecting-rod E, which is secured therein in any suitable manner. Between the enlargement $e$ and the hanger C' and on the rod E is located a spring $d$, one end of which rests against the enlargement $e$ and the other end thereof against the inner surface of the hanger C', near the slot $C^2$, through which the rod E extends and operates. On the opposite side of the hanger from the spring $d$ and on the rod E is located another spring $d'$, one end of which rests against the hanger and the other end against an adjustable nut $d^2$ on the rod, which nut is used for regulating the tension of said spring.

As before stated, the brake or shoe C is hinged or pivotally connected to the lower part of the hanger C', and for this purpose their adjacent portions are provided with suitable lugs or ears $g$, through which is passed a pin or bolt $g'$ for uniting them. While I prefer to make the hanger and shoe of two pieces, for the reason that by so doing they may be more readily placed upon the drum, yet I may sometimes make it of one piece, which shall possess sufficient flexibility to allow it to be clamped on the drum. I may also sometimes use a drum made of one piece instead of two pieces, as shown; but as it would be necessary to place such a drum on the axle before the wheels are secured thereon I prefer to use a drum of two pieces, as shown and described, which can be secured in place on the axle or removed therefrom at any time.

While I have shown the brake applied to one axle only of the car, yet it is obvious that I may apply them to each axle and that I may employ one or more brakes on each of the axles and locate them at any desired point thereon without departing from the spirit of my invention. It is also evident that I may vary the arrangement of the connecting and operating rods or mechanism for operating my brake, and for this reason I do not desire to be limited to the specific arrangement of said parts as shown.

The operation of my brake is simple and as follows: By drawing the lever E', through the medium of either of the rods F and F', to the position indicated by dotted lines in Fig. 2 it is obvious that the portion C and hanger C', when composed of two pieces, will be clamped thereon, and as I provide the inner surface of said parts with a suitable lubricant that the frictional contact therewith will be applied and act in such a manner as to gradually retard or impede the revolution of the axle, thus preventing the wheels sliding on the tracks. When thus tightened on the drum, the spring $d$ will be contracted and the spring $d'$ extended; but as soon as the force is removed from the lever E' the spring $d$ will force the portion C of the brake out of contact with the drum and will retract the rod E until the spring $d'$ thereon assumes its normal condition. It will therefore be seen and clearly understood that by using these springs a cushion is formed for the brake, which will prevent it from contacting with the drum except when desired and when pressure is applied thereto.

When the hanger C' and piece C are made integral, the same operation as above described is carried out; but in order, in such a case, to hold the brake from the drum a spring $d$ of sufficient strength must be used to overcome the tension of the brake and to distend it or to press the portion $e$ from the vertical part of the hanger.

In order to prevent dust, gravel, sand, and the like accumulating on the drum or brake, I sometimes place therearound a closed shield (not shown) and thus exclude all deleterious substances therefrom.

Having thus fully described my invention, what I claim as new, and desire to secure by Letters Patent, is—

1. The combination with an axle, of a brake secured at its upper part, and extending partly around the axle, a rod connected at one of its ends to the free end of the brake and having means at its other end to operate it, and springs secured on said rod on each side of the vertical part of the brake, substantially as described.

2. The combination with an axle, of a drum secured thereon, a brake fixed at its upper part and extending partly around the axle and provided with a slot, a rod extending through said slot and connected to the free end of the brake, a spring between the free end and vertical part of the brake, another spring on the rod on the opposite side of the brake, and a device for operating said rod, substantially as described.

3. The combination with an axle, of a split drum secured thereon, a brake composed of two circular parts hinged or pivoted together and extending partly around the drum, one of said parts being fixed at its upper end and provided with a slot, a rod extending through said slot and connected to the free end of the brake, a spring between the free end of the brake and the fixed portion thereof, another spring on the opposite side of the fixed part of the brake, and a device for operating the rod, substantially as described.

4. The combination with an axle, of a brake secured at its upper part, and extending partly around the axle, a rod connected at one of its ends to the free end of the brake and having means at its other end to operate it, a spring between the free end of the brake and the fixed part thereof, and another spring on said rod and on the opposite side of the fixed part of the brake from the first-named spring, an adjusting-nut on said rod for the last-named spring, substantially as described.

JOHN W. DUDLEY.

Witnesses:
CHAS. C. TILLMAN,
W. L. DUDLEY.